(12) United States Patent
Oike et al.

(10) Patent No.: US 9,062,997 B2
(45) Date of Patent: Jun. 23, 2015

(54) LIQUID LEVEL DETECTOR

(75) Inventors: Toshio Oike, Shizuoka (JP); Ryo Hirose, Shizuoka (JP); Masaki Hirota, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 84 days.

(21) Appl. No.: 13/278,554

(22) Filed: Oct. 21, 2011

(65) Prior Publication Data

US 2012/0103090 A1    May 3, 2012

(30) Foreign Application Priority Data

Oct. 22, 2010 (JP) ................................. 2010-237773
Apr. 25, 2011 (JP) ................................. 2011-097407

(51) Int. Cl.
*G01F 23/32* (2006.01)
*G01F 23/36* (2006.01)

(52) U.S. Cl.
CPC ..................................... *G01F 23/36* (2013.01)

(58) Field of Classification Search
CPC ......... G01F 23/36; G01F 23/363; H01B 1/16; H01B 1/22; H01C 17/283; H01C 10/32
USPC .......... 73/290 R, 290 B, 318, 320, 305–322.5
See application file for complete search history.

(56) References Cited

U.S. PATENT DOCUMENTS

| 6,142,018 | A * | 11/2000 | Dedert et al. | 73/305 |
| 6,389,892 | B1 * | 5/2002 | Sato et al. | 73/304 R |
| 7,100,442 | B1 * | 9/2006 | Huttinger | 73/317 |
| 7,111,510 | B2 * | 9/2006 | Tadoa et al. | 73/304 R |
| 7,591,178 | B2 * | 9/2009 | Ireland et al. | 73/313 |
| 2002/0040597 | A1 * | 4/2002 | Sawert et al. | 73/317 |
| 2002/0046601 | A1 | 4/2002 | Yasuda et al. | |
| 2007/0163341 | A1 * | 7/2007 | Nagakura et al. | 73/305 |

(Continued)

FOREIGN PATENT DOCUMENTS

JP    6-49562 A    2/1994
JP    2002-202179    7/2002

(Continued)

OTHER PUBLICATIONS

Japanese Office Action issued in Japanese Patent Application No. 2011-097407 on Dec. 9, 2014.

*Primary Examiner* — Daniel S Larkin
*Assistant Examiner* — Jamar Ray
(74) *Attorney, Agent, or Firm* — Morgan, Lewis & Bockius LLP

(57) ABSTRACT

A liquid level detector is provided. A resistance plate has a plurality of conductive segments. A float vertically moves according to change of a liquid level to be measured. A float arm has one end attached to the float and the other end rotatably supported to rotate according to the vertical movement of the float. Contact points slide on the conductive segments with the rotation of the float arm according to the liquid level. The conductive segments are formed of a glass-sintered metallic body made of glass and gold alloy material containing a gold (Au) content equal to or greater than 18% by mass and less than 40% by mass. The contact points are formed of a gold alloy material containing a gold (Au) content equal to or greater than 32.5% by mass and less than 77% by mass.

6 Claims, 4 Drawing Sheets

(56) References Cited

U.S. PATENT DOCUMENTS

2010/0223993 A1* 9/2010 Shimizu et al. .............. 73/317
2010/0242596 A1  9/2010 Park et al.

FOREIGN PATENT DOCUMENTS

| JP | 2003-287457 | 10/2003 |
|----|-------------|---------|
| WO | 03/003384 A2 | 1/2003 |

* cited by examiner

1 LIQUID LEVEL DETECTOR
10 FLOAT
11 FLOAT ARM
13 RESISTANCE PLATE
14 SLIDING CONTACT

LIQUID LEVEL DETECTOR

BACKGROUND

The present invention relates to a liquid level detector, and more particularly, to a liquid level detector which automatically detects a liquid level as a remaining amount of liquid stored in a transportation fuel tank of a car, an airplane or the like.

Conventionally, as an apparatus for detecting a liquid level in a fuel tank of a car, there has been known a liquid level detector in which a float arm is slid on a resistance plate by a float vertically moving according to a liquid level, and the liquid level is converted into a potential difference to detect the height of liquid.

An example of the liquid level detector will be described. FIG. 1 is an electric block diagram for explaining a structural example of a sensor used in a liquid level detector according to the related art and the present invention. FIG. 2 is an explanatory diagram for explaining a structural example of the liquid level detector according to the related art and the present invention. FIG. 3 is an explanatory diagram for explaining a structural example of a variable resistor in the sensor according to the related art and the present invention.

A sensor 2 of a liquid level detector 1 includes a variable resistor 3 which varies its resistance as contact points 19 and 20 move according to the change in height of liquid in a tank T of an airtight container. The variable resistor 3 is connected in series to a fixed resistor 7. The variable resistor 3 and the fixed resistor 7 are connected to a power circuit 4 which applies a specific voltage thereto.

The sensor 2 includes, as shown in FIGS. 2 and 3, a resistance plate 13 attached to a main body frame 12, and a sliding contact 14 connected to a float arm 11. In this case, a float 10 is floating on a liquid surface by the buoyancy of the liquid and is attached to a front end of the float arm 11, and the sliding contact 14 is connected to the other end of the float arm 11. The resistance plate 13 of the sensor 2 is provided with a first conductive pattern 15 and a second conductive pattern 16. The two conductive patterns 15 and 16 are arranged in parallel to each other in a circular arc shape centering on a rotational shaft 21 of the float arm 11. An input/output conductive portion 17 is connected to one end of the first conductive pattern 15, and an input/output conductive portion 18 is connected to one end of the second conductive pattern 16.

The first conductive pattern 15 includes a plurality of conductive segments 15a arranged at predetermined intervals in a circumferential direction of the circular arc-shaped pattern, and a resistor 15b electrically connecting the conductive segments 15a to each other. Further, the second conductive pattern 16 includes a plurality of conductive segments 16a arranged at predetermined intervals in a circumferential direction of the circular arc-shaped pattern, and a connector 16b electrically connecting the conductive segments 16a to each other.

The sliding contact 14 has two contact points 19 and 20 electrically connected to each other. Further, the sliding contact 14 is connected to the rotational shaft 21 provided at the other end of the float arm 11. The float arm 11 moves downward according to the amount consumed from a liquid level of the float 10 floating on the liquid surface in a full state, so that the float arm 11 is rotated in a direction of arrow Y of FIG. 3 with respect to the rotational shaft 21. Accordingly, the sliding contact 14 is also rotated in the direction of arrow Y of FIG. 3 with the rotation of the float arm 11. By the rotation of the sliding contact 14, the contact points 19 and 20 slide on and come into electrical contact with the conductive segments 15a and 16a arranged on the first conductive pattern 15 and the second conductive pattern 16 respectively. Accordingly, the length of the resistor 15b interposed between the input/output conductive portion 17 connected to the first conductive pattern 15 and the input/output conductive portion 18 connected to the second conductive pattern 16 is changed, thereby changing a resistance of a circuit interposed between the input/output conductive portions 17 and 18 (i.e., a resistance of the variable resistor 3 of FIG. 1). The first conductive pattern 15, the second conductive pattern 16 and the sliding contact 14 constitute the variable resistor 3.

When a voltage is applied to the variable resistor 3, the sensor 2 detects a potential difference between the input/output conductive portions 17 and 18, and outputs an output signal to a processing circuit 5. The processing circuit 5 calculates a remaining amount of liquid on the basis of the output signal of the sensor 2 and the result thereof is displayed in a bar graph or analog form on a display such as a meter 6. Further, the meter 6 may include a fixed resistor provided in a line connected to the processing circuit 5.

In the aforementioned liquid level detector, the contact points are generally formed of an alloy of silver (Ag) and palladium (Pd), an alloy of silver (Ag) and copper (Cu), an alloy of silver (Ag) and nickel (Ni) or the like. Further, the conductive segments are formed of, e.g., a mixture of Ag—Pd powder and glass, which is obtained by mixing silver power, palladium power and glass powder into paste, printing the paste on the resistance plate, and then drying and sintering the paste.

However, the liquid level detector may be used in a fuel tank of a car using, as a fuel, an electrolytic solution (alcohol) such as ethanol and methanol, or gasoline including the electrolytic solution. Since silver (Ag) has a low electric resistance, silver exhibits excellent conductivity. However, the contact points or the conductive segments formed of silver may be degraded or corroded due to sulfur, water, alcohol and the like included in the fuel. As a result, conduction failure may occur to thereby make measurement impossible or cause measurement errors. Accordingly, in order to prevent the conductive segments or the contact points from being degraded or corroded, there has been proposed a technology for mixing gold (Au) with a material of the conductive segments or the contact points, thereby improving degradation resistance and corrosion resistance (see, e.g., Patent Documents 1 and 2).

Patent Document 1: JP-A-2002-202179
Patent Document 2: JP-A-2003-287457

However, in case of using a gold alloy to ensure the degradation resistance and corrosion resistance, the gold content is required to be equal to or greater than about 40% by mass in the conductive segments and to be equal to or greater than about 98% by mass in the contact points in order to obtain a sufficient effect. In addition, the use of expensive gold leads to an increase in cost.

SUMMARY

It is therefore an object of the present invention to provide a liquid level detector capable of reducing material cost while ensuring degradation resistance and corrosion resistance not only in the general environment but also in the environment including sulfur.

The object of the present invention can be achieved by the following configurations (1) to (9).
(1) A liquid level detector, comprising: a resistance plate having a plurality of conductive segments; a float that vertically moves according to change of a liquid level to be measured; a float arm having one end attached to the float and the other end rotatably supported to rotate according to the vertical movement of the float; and contact points that slide on the conductive segments with the rotation of the float arm according to the liquid level, wherein the conductive segments are formed of a glass-sintered metallic body made of glass and gold alloy material containing a gold (Au) content equal to or greater than 18% by mass and less than 40% by mass, and wherein the contact points are formed of a gold alloy material containing a gold (Au) content equal to or greater than 32.5% by mass and less than 77% by mass.

(2) The liquid level detector according to (1), wherein the gold alloy material of the conductive segments does not include silver (Ag).

(3) The liquid level detector according to (2), wherein the gold alloy material of the conductive segments includes at least one of palladium (Pd) and platinum (Pt).

(4) The liquid level detector according to (3), wherein the gold alloy material of the conductive segments includes at least one selected from a group consisting of cobalt (Co), nickel (Ni), ruthenium (Ru) and copper (Cu).

(5) The liquid level detector according to (1), wherein the gold alloy material of the conductive segments includes at least gold (Au), silver (Ag) and palladium (Pd).

(6) The liquid level detector according to (5), wherein the gold alloy material of the conductive segments containing a silver-palladium (Ag—Pd) alloy content equal to or greater than 60% by mass and equal to or less than 82% by mass.

(7) The liquid level detector according to (5) or (6), wherein the gold alloy material of the conductive segments includes at least one selected from a group consisting of cobalt (Co), nickel (Ni), ruthenium (Ru), copper (Cu) and platinum (Pt).

(8) The liquid level detector according to any one of (1) to (7), wherein the gold alloy material of the contact points includes at least one selected from a group consisting of nickel (Ni), palladium (Pd), cobalt (Co), copper (Cu), silver (Ag) and zinc (Zn).

(9) The liquid level detector according to any one of (1) to (8), wherein the gold alloy material of the contact points includes a nickel (Ni) content equal to or greater than 23% by mass and equal to or less than 67.5% by mass.

According to the present invention, it is possible to provide a liquid level detector having sufficient degradation resistance and corrosion resistance in presence of sulfur of gasoline or the like by using a combination of a resistance plate having conductive segments formed of a gold alloy containing a predetermined amount of gold, and a sliding contact having contact points formed of a gold alloy containing a predetermined amount of gold. Further, since the gold contents of materials of the conductive segments and the contact points are small compared to conventionally used materials, it is possible to reduce material cost, thereby reducing manufacturing cost of the liquid level detector.

DETAILED DESCRIPTION OF THE EMBODIMENTS

Hereinafter, illustrative embodiments of the present invention will be described with reference to the accompanying drawings.

A basic structure of a liquid level detector according to the present invention is equal to that of the liquid level detector according to the related art which has been described in detail with reference to FIGS. 1, 2 and 3, but the structure will be explained again.

Figure 1:
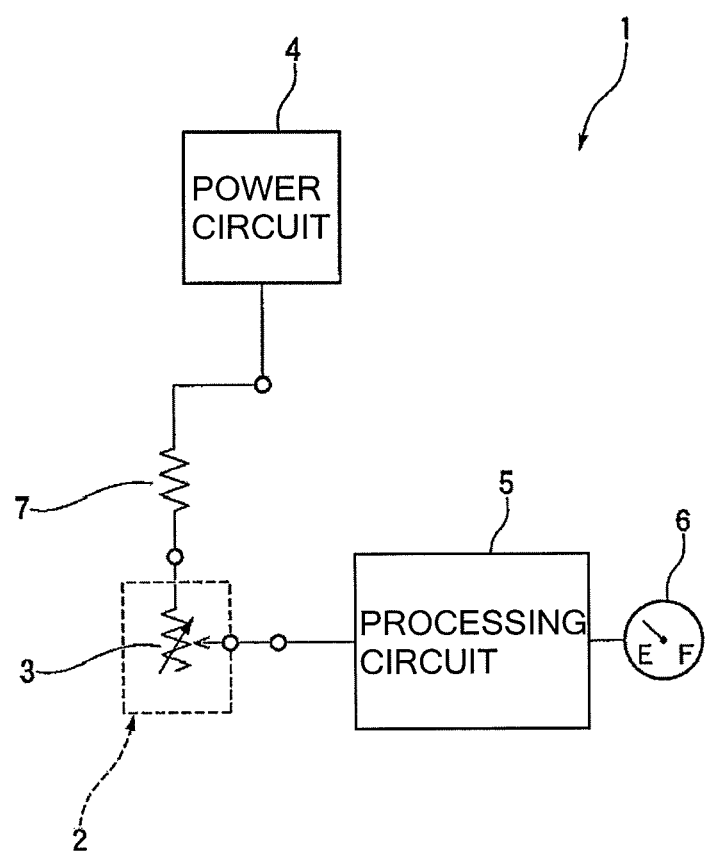
FIG. 1 is an electric block diagram for explaining a structural example of a sensor used in a liquid level detector according to the related art and the present invention.

As illustrated in FIG. 1, the sensor 2 of the liquid level detector 1 includes the variable resistor 3 which varies its resistance as the contact points 19 and 20 move according to the change in height of liquid in the tank T of the airtight container. The variable resistor 3 is connected in series to the fixed resistor 7. The variable resistor 3 and the fixed resistor 7 are connected to the power circuit 4 which applies a specific voltage thereto.

Figure 2:
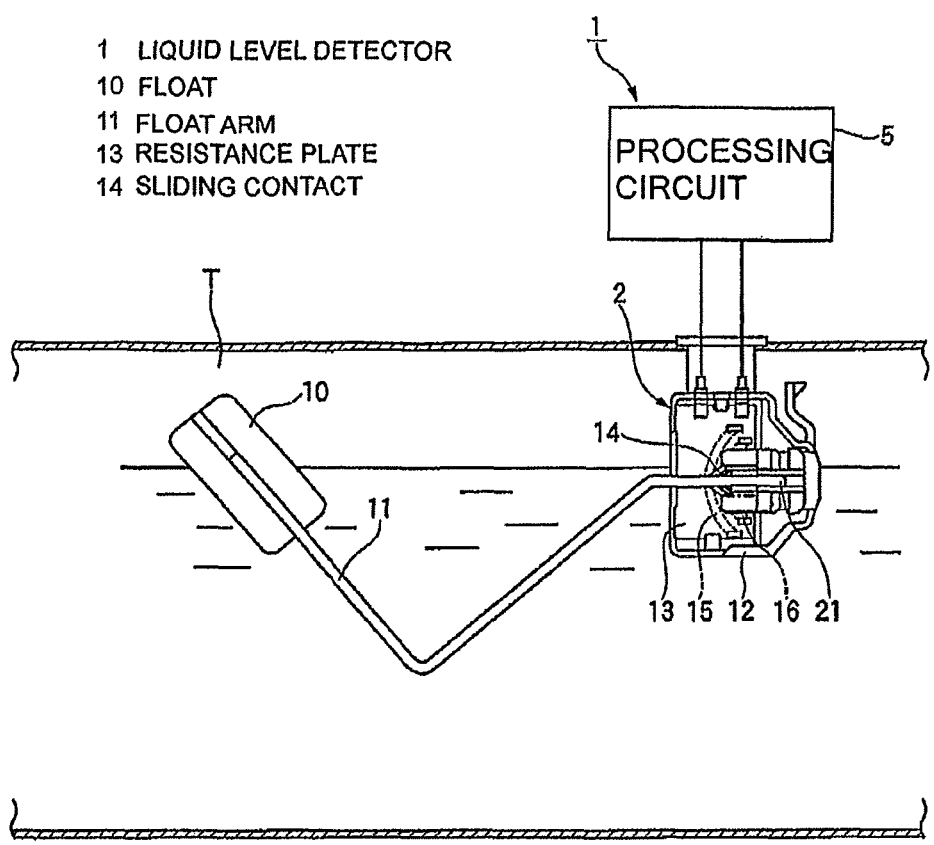
FIG. 2 is an explanatory diagram for explaining a structural example of the liquid level detector according to the related art and the present invention.
Figure 3:
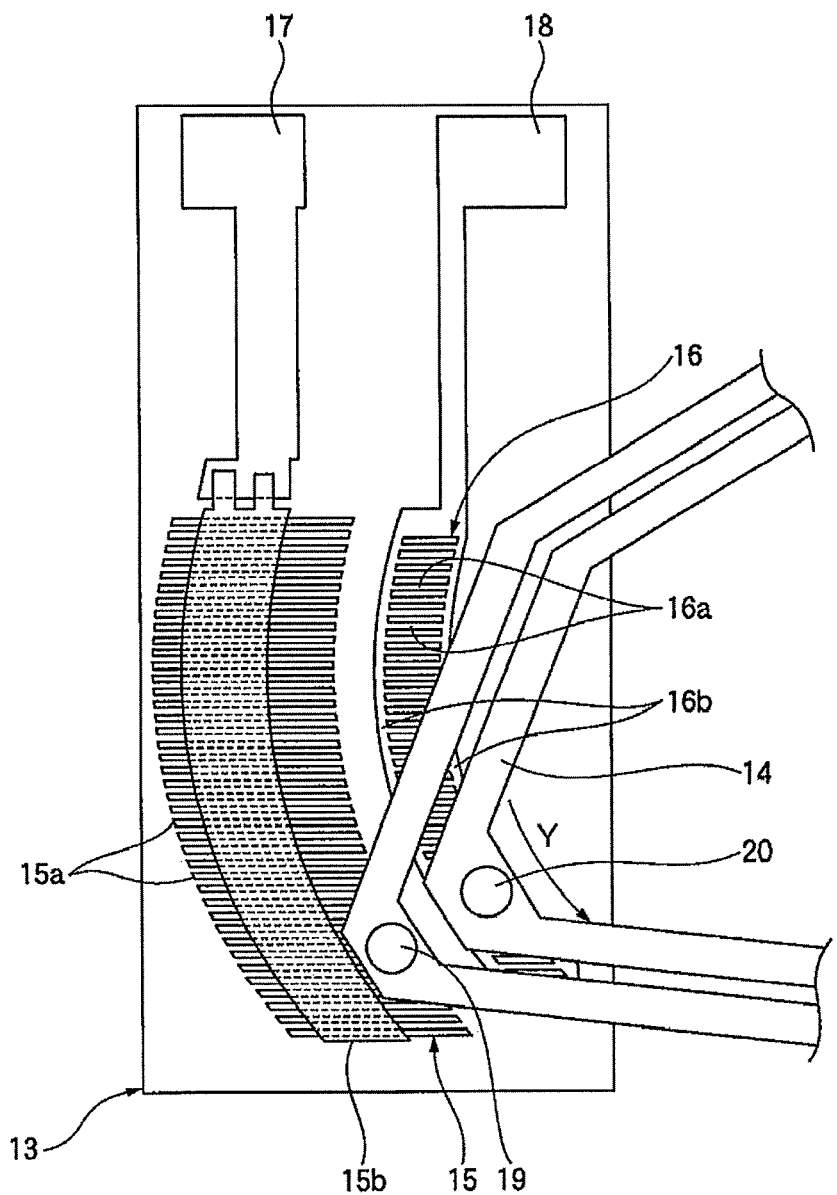
FIG. 3 is an explanatory diagram for explaining a structural example of a variable resistor in the sensor according to the related art and the present invention.

The sensor 2 includes, as shown in FIGS. 2 and 3, the main body frame 12, the resistance plate 13 attached to the main body frame 12 and the sliding contact 14. The sliding contact 14 is connected to a base end of the float arm 11 having the float 10 attached to the front end thereof. In this case, the float 10 is floating on a liquid surface by the buoyancy of the liquid. The resistance plate 13 of the sensor 2 is provided with the first conductive pattern 15 and the second conductive pattern 16. The two conductive patterns 15 and 16 are arranged in parallel to each other in a circular arc shape centering on the rotational shaft 21 of the float arm 11. Further, the input/output conductive portion 17 is connected to one end of the first conductive pattern 15, and the input/output conductive portion 18 is connected to one end of the second conductive pattern 16.

The first conductive pattern 15 includes a plurality of conductive segments 15a arranged at predetermined intervals in a circumferential direction of the circular arc-shaped pattern, and the resistor 15b electrically connecting the conductive segments 15a to each other. Further, the second conductive pattern 16 includes a plurality of conductive segments 16a arranged at predetermined intervals in a circumferential direction of the circular arc-shaped pattern, and the connector 16b electrically connecting the conductive segments 16a to each other.

The sliding contact 14 includes two concentric frames centering on the base end of the float arm 11. The contact points 19 and 20 are provided in the two frames respectively and electrically connected to each other. Further, the sliding contact 14 is connected to the rotational shaft 21 provided at the base end of the float arm 11.

The float arm 11 moves downward according to the amount consumed from a liquid level of the float 10 floating on the liquid surface in a full state, so that the float arm 11 is rotated in the direction of arrow Y of FIG. 3 with respect to the rotational shaft 21. Accordingly, the sliding contact 14 is also rotated in the direction of arrow Y of FIG. 3 with the rotation of the float arm 11. By the rotation of the sliding contact 14, the contact point 19 slides on and comes into electrical contact with the conductive segments 15a arranged on the first conductive pattern 15, and the contact point 20 slides on and comes into electrical contact with the conductive segments 16a arranged on the second conductive pattern 16. Accordingly, the length of the resistor 15b interposed between the input/output conductive portion 17 connected to the first conductive pattern 15 and the input/output conductive portion 18 connected to the second conductive pattern 16 is changed, thereby changing the resistance of the circuit interposed between the input/output conductive portions 17 and 18 (i.e., the resistance of the variable resistor 3 of FIG. 1). As described above, the first conductive pattern 15, the second conductive pattern 16 and the sliding contact 14 constitute the variable resistor 3.

When a voltage is applied to the variable resistor 3, the sensor 2 detects a potential difference between the input/output conductive portions 17 and 18, and outputs an output signal to the processing circuit 5. The processing circuit 5 calculates a remaining amount of liquid on the basis of the output signal of the sensor 2 and the result thereof is displayed in a bar graph or analog form on a display such as the meter 6. Further, the meter 6 may include a fixed resistor provided in a line connected to the processing circuit 5.

In sliding contact points between the sliding contact 14 and the conductive patterns 15 and 16, the contact points 19 and 20 of the sliding contact 14 and the conductive segments 15a and 16a of the conductive patterns 15 and 16 may be corroded due to corrosion of their alloy materials or abrasion powder, thereby causing contact failure at the contact points. Accordingly, in the embodiment of the present invention, a predetermined amount of gold (Au) is added to the alloy materials of the contact points 19 and 20 and the conductive segments 15a and 16a, so that an amount of abrasion can be reduced because gold has an excellent sliding property.

In the embodiment of the present invention, the conductive segments 15a and 16a are formed of a glass-sintered metallic body containing a gold alloy material and glass. Since gold (Au) has ductility and excellent resistance against chemical corrosion, gold is included in the material of the conductive segments 15a and 16a. Accordingly, it is possible to improve corrosion resistance against sulfur included in gasoline and also increase a sliding property in sliding contact between the conductive segments 15a and 16a and the contact points 19 and 20, thereby preventing contact failure between the conductive segments 15a and 16a and the contact points 19 and 20.

The gold content of the gold alloy material of the conductive segments 15a and 16a is preferably equal to or greater than 18% by mass and less than 40% by mass, and more preferably, equal to or greater than 20% by mass and less than 35% by mass. By maintaining the gold content of the gold alloy material of the conductive segments 15a and 16a to be equal to or greater than 18% by mass, it is possible to sufficiently suppress the corrosion of the alloy, thereby sufficiently ensuring the corrosion resistance and degradation resistance of the conductive segments 15a and 16a. Further, by maintaining the gold content of the gold alloy material to be less than 40% by mass, it is possible to reduce the material cost, thereby suppressing an increase in price of the liquid level detector.

In the embodiment of the present invention, as a preferred example of the glass-sintered metallic body of the conductive segments 15a and 16a, there is a glass-sintered metallic body containing a gold alloy material without silver (Ag) (hereinafter, referred to as a "first gold alloy material for the conductive segments") and glass. Since silver is not included in the first gold alloy material for the conductive segments, it is possible to reduce variation in the electric resistance.

It is preferable that the first gold alloy material for the conductive segments includes at least one of palladium (Pd) and platinum (Pt). The palladium and/or platinum content of the first gold alloy material for the conductive segments is preferably equal to or greater than 60% by mass and equal to or less than 82% by mass, and more preferably, ranges from 65% to 80% by mass. By maintaining the palladium and/or platinum content to be equal to or greater than 60% by mass, it is possible to enhance abrasion resistance of the conductive segments. By maintaining the palladium and/or platinum content to be equal to or less than 82% by mass, it is possible to prevent an increase in electrical resistance.

In the embodiment of the present invention, the first gold alloy material for the conductive segments may include other metal materials, e.g., at least one selected from a group consisting of cobalt (Co), nickel (Ni), ruthenium (Ru) and copper (Cu) without adversely affecting the effect of the present invention. In a case where the first gold alloy material for the conductive segments includes other metal materials, the content thereof is preferably equal to or greater than 60% by mass and equal to or less than 82% by mass.

Further, the glass included in the conductive segments 15a and 16a may be, e.g., lead borosilicate glass, bismuth oxide or the like. The glass is included in the conductive segments 15a and 16a in order to increase hardness of the conductive segments 15a and 16a. The glass preferably ranges from 18 parts by mass to 40 parts by mass, and more preferably, ranges from 22 parts by mass to 30 parts by mass with respect to 100 parts by mass of the first gold alloy material for the conductive segments.

The conductive segments 15a and 16a are formed by mixing gold powder, desired metal powder, glass powder and a binder with a solvent to form a paste, printing the paste on the resistance plate by, e.g., screen printing, and drying and sintering the paste.

In the embodiment of the present invention, as another preferred example of the glass-sintered metallic body of the conductive segments 15a and 16a, there is a glass-sintered metallic body containing a gold alloy material including at least gold (Au), silver (Ag) and palladium (Pd) (hereinafter, referred to as a "second gold alloy material for the conductive segments") and glass. By using the second gold alloy material for the conductive segments including the above-mentioned metal materials, since silver is protected by gold atoms, it is possible to prevent the conductive segments 15a and 16a from being corroded due to sulfur included in the fuel.

The Ag—Pd alloy content of the second gold alloy material for the conductive segments is preferably equal to or greater than 60% by mass and equal to or less than 82% by mass, and more preferably, equal to or greater than 65% by mass and equal to or less than 80% by mass. By maintaining the Ag—Pd alloy content of the second gold alloy material for the conductive segments to be equal to or greater than 60% by mass, it is possible to increase hardness of the conductive segments 15a and 16a, thereby ensuring the abrasion resistance. By maintaining the Ag—Pd alloy content to be equal to or less than 82% by mass, it is possible to ensure the corrosion resistance and degradation resistance of the conductive segments 15a and 16a. Further, it is preferable that the silver content of the Ag—Pd alloy is equal to or greater than 35% by mass and equal to or less than 45% by mass, and the palladium content of the Ag—Pd alloy is equal to or greater than 35% by mass and equal to or less than 45% by mass.

A mixture ratio (mass ratio) of gold (Au), silver (Ag) and palladium (Pd) of the second gold alloy material for the conductive segments is preferably 18-40:35-45:35-45, and more preferably, 20-35:35-45:35-45.

In the embodiment of the present invention, the second gold alloy material for the conductive segments may include other metal materials, e.g., at least one selected from a group consisting of cobalt (Co), nickel (Ni), ruthenium (Ru), copper (Cu) and platinum (Pt) without adversely affecting the effect of the present invention. In a case where the second gold alloy material for the conductive segments includes other metal materials, the content thereof is preferably equal to or greater than 60% by mass and equal to or less than 82% by mass.

Further, the glass included in the conductive segments 15a and 16a may be, e.g., lead borosilicate glass, bismuth oxide or the like. The glass is included in the conductive segments 15a and 16a in order to increase hardness of the conductive segments 15a and 16a. The glass preferably ranges from 18 parts by mass to 40 parts by mass, and more preferably, ranges from 22 parts by mass to 30 parts by mass with respect to 100 parts by mass of the second gold alloy material for the conductive segments.

The conductive segments 15a and 16a are formed by mixing gold powder, silver powder, palladium powder, desired metal powder, glass powder and a binder with a solvent to form a paste, printing the paste on the resistance plate by, e.g., screen printing, and drying and sintering the paste.

Further, in the embodiment of the present invention, the contact points 19 and 20 are formed of a gold alloy material. The gold content of the gold alloy material is equal to or greater than 32.5% by mass and less than 77% by mass, and preferably, equal to or greater than 35% by mass and equal to or less than 70% by mass. By maintaining the gold content of the gold alloy material of the contact points 19 and 20 to be equal to or greater than 32.5% by mass, it is possible to ensure the corrosion resistance of the contact points. Further, by maintaining the gold content of the gold alloy material to be less than 77% by mass, it is possible to reduce the material cost, thereby suppressing an increase in price of the liquid level detector.

The gold alloy material of the contact points 19 and 20 may include other metal materials, e.g., at least one selected from a group consisting of nickel (Ni), palladium (Pd), cobalt (Co), copper (Cu), silver (Ag) and zinc (Zn) without adversely affecting the effect of the present invention. In a case where the gold alloy material of the contact points 19 and 20 includes other metal materials, the content thereof is preferably equal to or greater than 23% by mass and equal to or less than 67.5% by mass, and more preferably, equal to or greater than 30% by mass and equal to or less than 65% by mass. By maintaining the other metal material content of the gold alloy material to be equal to or greater than 23% by mass, it is possible to increase hardness of the contact points, thereby ensuring the abrasion resistance. By maintaining the other metal material content to be equal to or less than 67.5% by mass, it is possible to ensure the corrosion resistance of the other metal materials. In the embodiment of the present invention, it is preferable that nickel (Ni) is used as the other metal materials.

The contact points 19 and 20 are formed by mixing gold (Au) with nickel (Ni) to form a molten gold alloy (ingot), making a rod/wire from the ingot, performing a drawing process using dies, and performing header processing (pressure molding) of the wire having a predetermined thickness.

By combining the resistance plate 13 having the conductive segments 15a and 16a formed as described above with the contact points 19 and 20 formed as described above, it is possible to prevent the degradation thereof due to the contact between the contact points 19 and 20 and the conductive segments 15a and 16a, and also prevent a portion of the conductive segments 15a without being in contact with the contact points 19 and 20 from being degraded due to sulfur of gasoline. In other words, in a case where the gold alloy material is used for only one side of the conductive segments 15a and 16a and the contact points 19 and 20, the gold content should be large in order to suppress the corrosion of the abrasion powder and alloy of the other side. However, by forming both sides using the gold alloy material, since both sides have corrosion inhibition effects, it is possible to exhibit excellent degradation resistance and corrosion resistance even though the gold content is small.

Further, since the amount of expensive gold used can be reduced, it is possible to reduce the material cost, thereby suppressing an increase in manufacturing cost of the liquid level detector.

Examples

Hereinafter, the present invention will be described in detail using examples. However, the scope of the present invention is not limited thereto.

<Preparation of Conductive Segments>

The conductive segments were prepared by forming mixtures having composition ratios as represented in Table 1 below, and printing the mixtures on the resistance plate.

<Preparation of Contact Points>

The molten alloy (ingot) was prepared by melting metal powder at composition ratios as represented in Table 1 below. Then, the contact points were prepared by making a wire from the ingot and performing a drawing process using dies.

TABLE 1

| | Composition Ratio of Metal Materials | |
|---|---|---|
| | Conductive Segments | Contact Points |
| 1 | Ag/Pd = 70/30 | Ni: 100 |
| 2 | Au/Ag/Pd = 17.5/52.5/30 | Ni: 100 |
| 3 | Au/Ag/Pd = 35/35/30 | Ni: 100 |
| 4 | Au/Pd = 35/65 | Ni/Au = 65/35 |
| 5 | Au/Pd = 70/30 | Ni/Au = 65/35 |

<Tests for Sulfur Resistance>

The high sulfur concentration fuel was prepared by the following composition:

Gasoline: 70 g
Methanol: 30 g
Sulfur powder: 200 ppm

The conductive segments and the contact points of the liquid level detector shown in FIGS. 1 to 3 are configured as shown in Table 1, and tests for sulfur resistance were conducted using the high sulfur concentration fuel. In the liquid level detector, the contact points were slid at a speed of 50 times/minute and repeated million times between point E (i.e., an empty state) at which the resistance has a maximum value and point F (i.e., a full state) at which the resistance has a minimum value. When the number of sliding times reaches 1,000,000, the variation in resistance was measured.

The tests were conducted five times for each case, and an average value thereof was calculated. The test results are represented in Table 2 and FIG. 4.

TABLE 2

| | Resistance Variation | | | | | |
|---|---|---|---|---|---|---|
| | $1^{st}$ time | $2^{nd}$ time | $3^{rd}$ time | $4^{th}$ time | $5^{th}$ time | Average |
| 1 | 4.6 | 4.3 | 3.9 | 5.1 | 4.6 | 4.5 |
| 2 | 4.4 | 4.5 | 3.7 | 4 | 3.9 | 4.1 |
| 3 | 1.9 | 2.5 | 1.8 | 2.5 | 2.4 | 2.22 |
| 4 | 0.7 | 1.2 | 0.7 | 0.8 | 0.9 | 0.86 |
| 5 | 0.5 | 1 | 0.5 | 0.6 | 0.7 | 0.66 |

Figure 4:
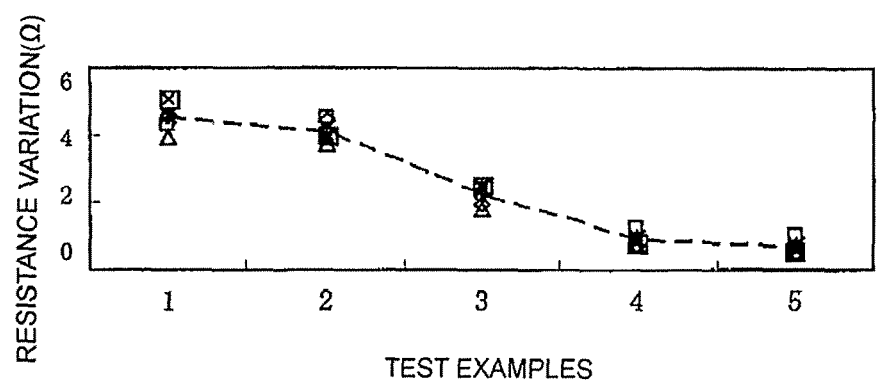
FIG. 4 is a graph showing the results of tests for sulfur resistance using high sulfur concentration fuel.

It can be seen from the results of Table 2 and FIG. 4 that the variation in resistance is reduced in Test examples 4 and 5 in which gold is included in both of the conductive segments and the contact points. Further, it can be seen that Test examples 4 and 5 have excellent corrosion resistance. Since the variation in resistance is almost the same in Test example 4 in which the gold content of the conductive segments is 35% by mass and in Test example 5 in which the gold content of the conductive segments is 70% by mass, it can be seen that Test example 4 has excellent corrosion resistance and degradation resistance while reducing the material cost.

The invention claimed is:

1. A liquid level detector, comprising:
    a resistance plate having a plurality of conductive segments;
    a float that vertically moves according to change of a liquid level to be measured;
    a float arm having one end attached to the float and the other end rotatably supported to rotate according to the vertical movement of the float; and
    contact points that slide on the conductive segments with the rotation of the float arm according to the liquid level,
    wherein the conductive segments are formed of a glass-sintered metallic body made of glass and gold alloy material that does not include silver (Ag) and containing gold (Au) content equal to or greater than 18% by mass and less than 40% by mass,
    wherein the contact points are formed of a gold alloy material containing gold (Au) content equal to greater than 32.5% by mass and less than 77% by mass, and
    wherein both the conductive segments and the contact points include gold within respective predetermined ranges and the combination of the amount of gold in the conductive segments and the contact points brings resistance variation of 1.8 ohm or less that is indicative of corrosion resistance and degradation resistance in sulfur resistance testing.

2. The liquid level detector according to claim 1, wherein the gold alloy material of the conductive segments includes at least one of palladium (Pd) and platinum (Pt).

3. The liquid level detector according to claim 2, wherein the gold alloy material of the conductive segments includes at least one selected from a group consisting of cobalt (Co), nickel (Ni), ruthenium (Ru) and copper (Cu).

4. The liquid level detector according to claim 1, wherein the gold alloy material of the conductive segments includes at least one selected from a group consisting of cobalt (Co), nickel (Ni), ruthenium (Ru), copper (Cu) and platinum (Pt).

5. The liquid level detector according to claim 1, wherein the gold alloy material of the contact points includes at least one selected from a group consisting of nickel (Ni), palladium (Pd), cobalt (Co), copper (Cu), silver (Ag) and zinc (Zn).

6. The liquid level detector according to claim 1, wherein the gold alloy material of the contact points includes a nickel (Ni) content in a range between 23% by mass and 67.5% by mass.

* * * * *